Oct. 4, 1960

E. O. DRYER 2,954,797

LEAK CONTROL JACKET APPARATUS

Filed Aug. 9, 1957

INVENTOR.
ELDON O. DRYER
BY
Sellers and Latta
—ATTORNEYS—

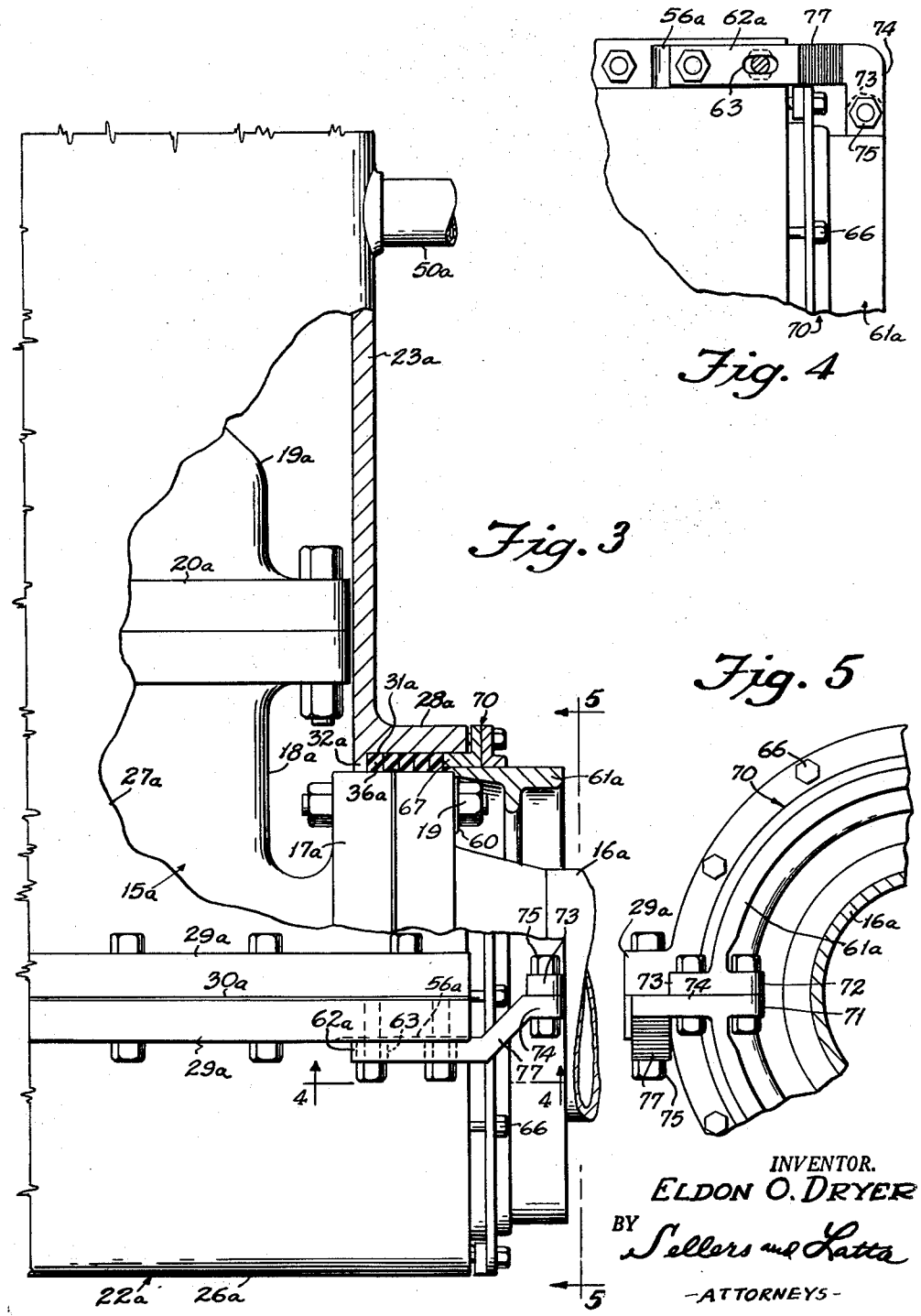

Oct. 4, 1960  E. O. DRYER  2,954,797
LEAK CONTROL JACKET APPARATUS
Filed Aug. 9, 1957  3 Sheets-Sheet 3

INVENTOR.
ELDON O. DRYER
BY Sellers and Latta
—ATTORNEYS—

United States Patent Office 2,954,797
Patented Oct. 4, 1960

2,954,797

LEAK CONTROL JACKET APPARATUS

Eldon O. Dryer, 22916 Burton St., Canoga Park, Calif.

Filed Aug. 9, 1957, Ser. No. 677,394

1 Claim. (Cl. 137—312)

This invention has as its general object to provide apparatus for controlling leaks in flanged connections and other types of fittings in pipe lines carrying fluids, and is especially concerned with the problem of fluid leaks in process plants (e.g. oil refineries or chemical plants) which are wasteful, dangerous, obnoxious and even toxic, and often bring on an unscheduled shut-down of facilities, at high direct cost to the operation in the plant.

Because shut-downs of processing plants are extremely costly, it is quite common practice to utilize the very expensive expedient of blowing steam on hydrocarbon leaks to dispel the hazardous vapor escaping from the leaks, cases being known where this expedient has been continued for as long as a year because a shut-down of the plant was calculated to be more costly than this extravagant waste of heat. With this problem in mind, the invention aims particularly to provide apparatus that can be applied to a leaking pipe line fitting to control or eliminate the leakage of fluid therefrom.

Another object is to provide leak control apparatus adaptable not only for simple flanged connections in pipe lines but also to control leaks in more complex fittings such as elbow connections, valves, etc.

A further object is to provide a leak control apparatus especially adapted to be installed upon and around a fitting in a pipe line without disturbing the assembly of parts in the pipe line or requiring the shutting down of operation or the arresting of fluid flow in the line.

Other objects and advantages will become apparent in the ensuing specification and appended drawing in which:

Fig. 3 is a side view, partially in section, showing a leak control apparatus embodying another modified form of the invention, particularly adapted for controlling leaks in large elbow or T-fittings or valve fittings;

Fig. 4 is a fragmentary view of the apparatus of Fig. 3, taken on the line 4—4 of Fig. 3;

Figure 5 is a fragmentary end view of the apparatus of Figure 3, taken on the line 5—5 of Figure 3;

Figure 2:
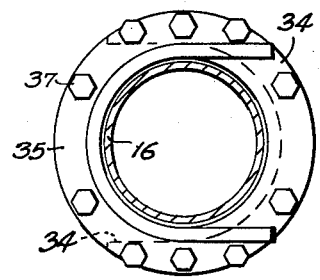
Fig. 2 is a cross sectional view on line 2—2 of Fig. 1.
Figure 1:
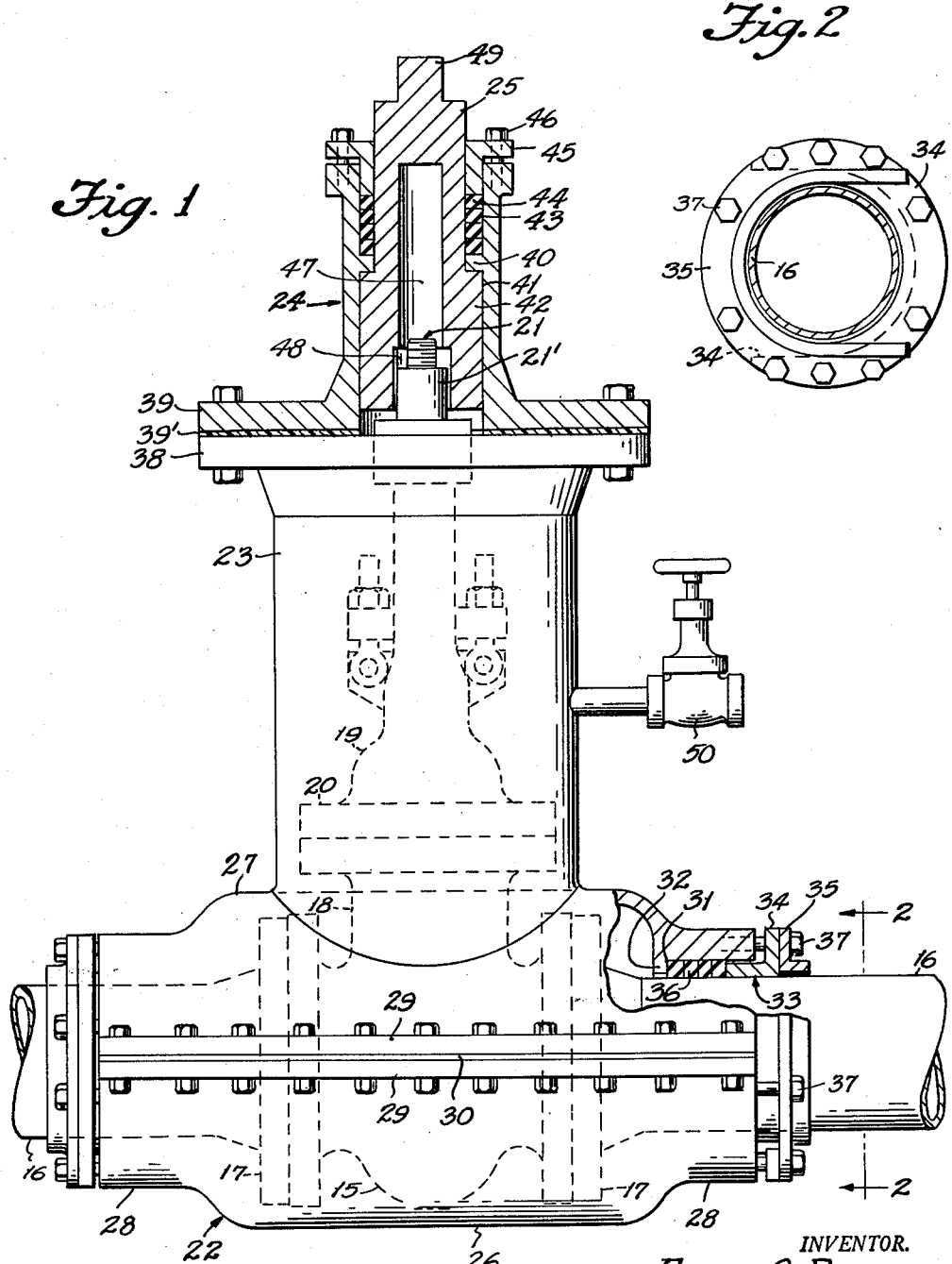
Fig. 1 is a side view of a leak control apparatus embodying one form of the invention, particularly adapted for controlling a leak in a valve.

*The invention as shown in Figs. 1 and 2*

Referring now to Fig. 1, I have shown therein, as an example of one form in which the invention may be embodied, a leak control jacket apparatus adapted to be installed around a leaking valve 15 secured between sections of a fluid transmitting line 16, the valve being attached to the tube sections by flanged joints 17. Such a valve may embody a neck section 18, a bonnet 19 attached by a flanged joint 20 to the neck section 18, and a valve stem 21 journalled in bonnet 19, having a nut 21', and normally mounting a hand wheel for rotational operation of the valve. For containing fluid leaking from such a fitting, regardless of whether the leak occurs in one of the joints 17 or the joint 20 or at the end of bonnet 19, the invention provides a leak control jacket assembly comprising generally a main jacket body 22 to contain the bonnet 19 and its joint 20, a cap assembly 24 for containing the end of stem 21, and an extension shank 25 which is journalled and sealed in cap 24 and adapted to establish clutching connection with the stem nut 21'.

The jacket body 22 comprises a back section 26 and a front section 27, each of semi-cylindrical form with reduced semi-cylindrical gland cuff sections (cooperatively defining cuffs 28) and each provided with a pair of diametrically opposed radial flanges 29 extending longitudinally thereof, bolted together as shown and sealed to one another by interposed gaskets 30 along a diametral plane of the body 22 so that the jacket body 22 may be readily assembled around the fitting parts 15 and 17 without disturbing the fluid line assembly.

Internally, the cuffs 28 have counter-bores which, when the jacket is installed around the pipe sections 16, define with the latter cylindrical annular gland chambers 31, the inner ends of which are closed by inwardly projecting shoulders 32. The outer ends of the chambers 31 receive respective sectional pressure rings 33 of composite cylindrical form, composed of axially projecting parts of two gland closure yokes 34, 35 of horseshoe shape (Fig. 2) in circumferential contour and of angle section axially as shown, each of these yokes having parallel arms which are in overlapping relation to the arms of the adjoining yoke so that the two yokes conjointly define a circular collar having the axial flange portion of pressure ring 33 projecting axially into the chamber 31. Packings 36 (e.g. each comprising a number of turns of packing rope of synthetic rubber or asbestos or the like wound helically around the pipe sections 16) are engaged under compression between shoulders 32 and rings 33 to seal the joints between the pipe sections 16 and the cuffs 28. Axial pressure is applied to the packing through ring 33 by means of cap screws 37 extended through openings in the radial flange portions of yokes 34 and 35 and threaded into the ends of the respective cuffs 28.

The invention is particularly characterized by the provision of the arrangement whereby the packings 36 are disposed in a packing chamber which communicates with the gaps defined between flanges 29 of the jacket body 22 interiorly of the latter, and which are extruded radially outwardly into these gaps and into sealing contact with the gaskets 30 so as to cooperate with the gaskets 30 in providing a complete seal of the sectional jacket around the fitting between tube sections 16 and around the fitting parts 15 and 17.

Sleeve 23 is formed integrally with jacket body section 27 and projects radially therefrom to enclose the joint 20 and bonnet 19. At its outer end, sleeve 23 has an end flange 38 to which is bolted a face flange 39 on the end of cap 24, a gasket 39' being interposed between and sealing the flanges to one another. Cap 24 has an integral internal abutment shoulder 40 intermediate its ends, a counterbore 41 inwardly of shoulder 40, in which an enlarged bearing head 42 of shank 25 (with a cylindrical outer wall) is journalled with adequate bearing length, and an outward counterbore 43 which defines, with the shank 25, a cylindrical annular packing chamber in which is disposed a packing 44. A pressure ring 45, of angle-section including a cylindrical leg entering the chamber 43, is pressed against the packing 44 by cap screws 46 extending through the radial leg of ring 45 and threaded into the end of cap 24. Shank 25 is journalled within the cylindrical leg of ring 45. Within shank 25, extending from the inner end thereof to a point near the outer end (which is closed), is a cavity 47 to receive the tip of stem 21 as it rises in valve opening direction. At the inner end of cavity 47 is a socket 48 of polygonal cross section, corresponding to that of the end of stem nut 21, so as to establish clutching connection between the stem nut 21' and shank 25. At its outer end, shank 25 has a wrenching tip 49 to which a suitable hand wheel or wrench may be applied for transmitting rotation through the shank 25 to the stem nut 21'.

Connected to sleeve 23 is a bleed valve 50 in the form of a shut-off cock. By opening the valve 50 the interior of sleeve 23 may be vented during the period of installation of the jacket apparatus around the fluid line parts 15, 16, 17, to avoid the leaking fluid being blown out through the joints of the jacket assembly while the sections thereof are being brought together around the fluid line. For example, if the leaking fluid is steam which would tend to scald the hands of the workman installing the apparatus, such steam may be vented through valve 50 in a direction radially away from the sleeve 23 and at a distance from the pipe section 16 so as to minimize the discomfort and hazard presented by the escaping steam. After the joints of the jacket have been tightened and sealed, the valve 50 may then be closed so as to provide a completely sealed chamber around the leak, containing the fluid and thus stopping the escape thereof.

The sectional construction of the jacket body 22 and the end gland parts 33, 34, 35 makes it possible to assemble the jacket apparatus over the pipe and fitting assembly without separating them.

*The invention as disclosed in Figs. 3, 4 and 5*

Figs. 3, 4 and 5 disclose a leak control jacket apparatus for containing a leak in a valve or other fitting portion of a fluid line of larger proportions than that shown in Fig. 1 but which may otherwise embody corresponding parts which are therefore referred to by numerals 15a, 16a, 17a, 18a, 19a and 20a to designate the parts corresponding to the parts numbered 15, 16, 17, 18, 19 and 20 of Fig. 1. The apparatus of this modified form of the invention, correspondingly comprises the jacket body 22a, the sleeve 23a, the body sections 26a, and 27a, the gland cuffs 28a, the longitudinal flanges 29a and interposed gasket 30a for joining and sealing the sections of body 22a, the bleed valve connection 50a, and a cap assembly corresponding to the cap assembly 24 (including extension shank 25) of Fig. 1, not illustrated in Fig. 3 because it can be the same as that illustrated in Fig. 1 except for size. The jacket body 22a differs from that of Fig. 1 in that the cuffs 28a, instead of being extended beyond the fluid line joints 17a and necked down as in Fig. 1, are of a full diameter such as to surround the joints 17a, and are sealed directly to the peripheries of joints 17a by packing 36a engaged under compression between the inner end shoulder 32a of packing chamber 31a and a gland ring assembly 70 divided along a diametral plane the same as in Figure 1. This form of the invention utilizes a guide ring 61a of sectional construction. The semi-cylindrical sections of the ring 61a are each counterbored to fit a corner of the adjacent pipe flange. The ring 61a is removably mounted on the assembly by means of L-shaped connector arms 62a. Each arm is received in a groove 56a in a flange 29a and may include an offset portion 77. The ring 61a functions to maintain a coaxial relationship between the gland cuffs 28a and pipe flanges during the early stages of assembly of the apparatus to maintain the packing chamber of uniform depth around the circumference of the joint during the insertion and compression of the packing 36a, thus assuring uniformity of sealing efficiency around the circumference of the joint. After the pressure ring 70 has been drawn up tightly against the packing, the guide ring 61a may, if desired, be removed from the assembly.

After the jacket assembly of Fig. 3 has been assembled and sealed to flanges 17a, the flange-coupling bolts 19 may be uncoupled one at a time (by removing their nuts) and sealing washers 60 may be inserted under the nuts and the nuts then replaced, thus sealing any leaks that may exist around the bolts.

Figure 6:
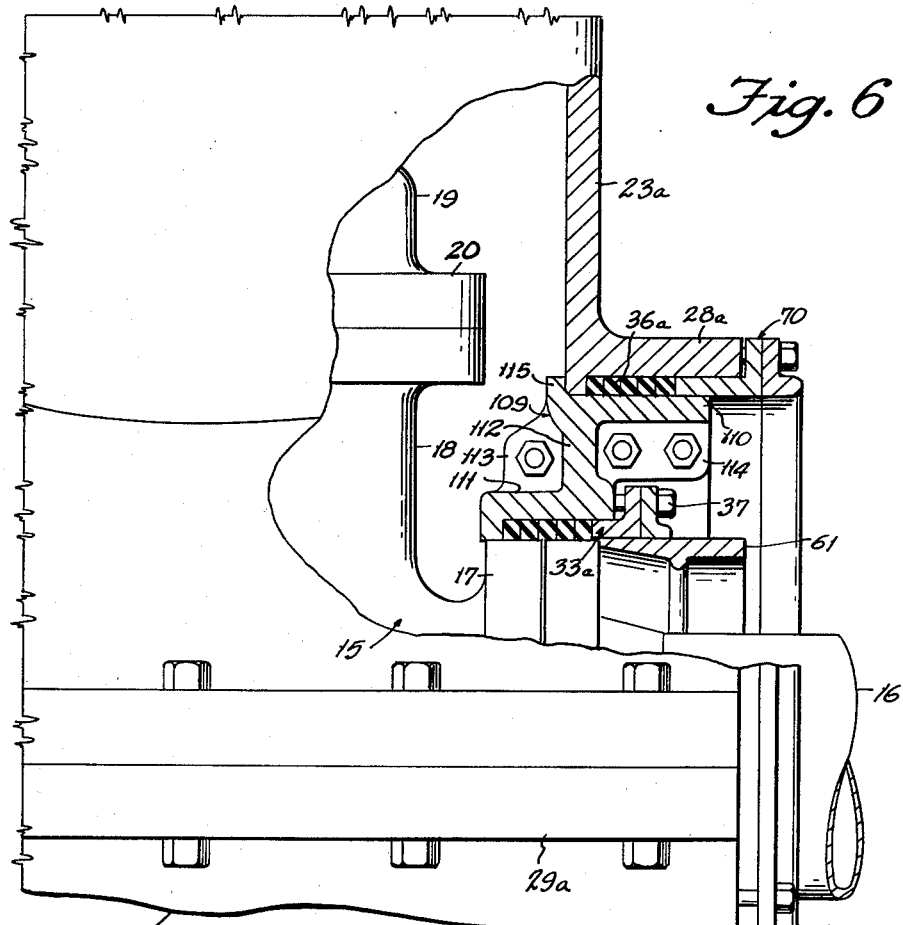
Fig. 6 is a fragmentary side view, partially in section, showing a leak control apparatus embodying a further modified form of the invention, particularly adapted for controlling a valve leak.

*The invention as shown in Fig. 6*

Fig. 6 illustrates a further modification of a leak control apparatus for a valve fitting portion of a fluid line assembly including parts 15, 16, 17, 18, 19 and 20 corresponding to the similarly numbered parts of Fig. 1. The jacket in this case is substantially the same as that disclosed in Fig. 3 and corresponding numerals are therefore applied thereto. In fact, the apparatus of Fig. 6 may utilize the jacket structure of Fig. 3 to isolate a valve fitting of smaller size in proportion to the size of the jacket than in Fig. 3. To adapt the larger cuff 28a to the smaller flange joint 17, there is utilized an adapter collar 109 including a rim 110, a neck 111, and a flat web 112 integrally joining the two. The adapter collar 109 is constructed in the form of two semi-cylindrical segments having at respective circumferential extremities, integral ears 113 and 114 which are bolted together in a diametral plane with an interposed gasket at each of the two diametrically opposed joints. Rim 110 has a radial peripheral flange 115 to seat against the flange 32a at the gasket to avoid movement of adapter collar assembly 109 outwardly due to pressure. A gland ring assembly 70 corresponding to the similarly numbered assembly of Fig. 3, engages packing 36a in an annular cylindrical packing chamber defined between rim 110 and cuff 28a and places the packing under compression to seal the adapter ring 109 to the cuff 28a in a manner similar to that described for the gland ring assembly 33 of Fig. 1.

Neck 111 has an integral radial flange 117 at its inner end, fitted to the periphery of flange joint 17 which is spaced radially from neck 111 to define an annular packing chamber in which is disposed packing 36. The packing is held under compression by a gland ring assembly 33a corresponding (except for diameter) to the similarly numbered assembly of Fig. 1, the cap screws 37 being threaded into the outer end of neck 111 to place the ring assembly 33a under compression. A guide ring 61 may be utilized for facilitating the assembly of the jacket apparatus along the joint 17.

Figure 7:
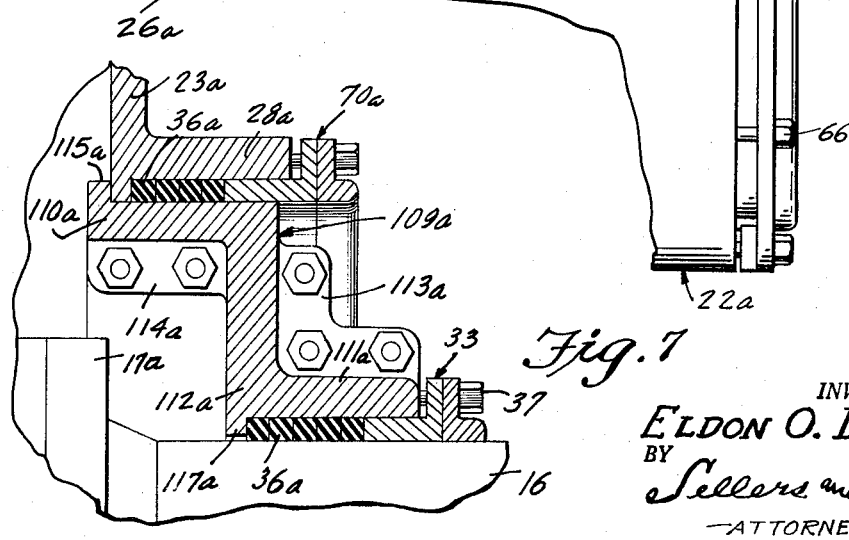
Fig. 7 is a fragmentary sectional view of a leak control apparatus embodying another form of the invention.

*The invention as disclosed in Fig. 7*

As shown in Fig. 7, an adapter ring assembly 109a including parts 110a, 111a, 112a, 113a, 114a, 115a and 117a, corresponding to the parts designated by the numerals (without the letter symbols) in Fig. 6, but differing from the adapter ring assembly 109 of Fig. 6 in having a neck 111a displaced outwardly of rim 110a instead of inwardly thereof and in having the web ring 112a of greater radial dimension and the neck 111a small enough to fit closely around the pipe 116, may be utilized as a direct sealing connection between the pipe 16 and the cuff 28a of a jacket assembly 23a, 28a, etc. corresponding to that of Fig. 6. Packing and pressure ring assemblies 36a, 70a (for sealing the adapter ring to the cuff 28a) and 33 (for sealing the neck 111a to the pipe 16) may be the same as in Fig. 6 except for the smaller diameters of the parts.

I claim:

A leak control jacket for a fluid line embodying a pipe section, a fitting having a radially projecting part, and a flanged joint connecting said fitting to said pipe section, said jacket comprising a pair of semi-cylindrical diametrically opposed sections having respective adjoining axially extending flanges; bolts extending through said flanges to secure them together with the jacket body disposed around the said fitting; one of said sections embodying an integral sleeve portion projecting radially therefrom, for containing said radially projecting part; said jacket body having at its end a cuff adapted for close encirclement of said flanged joint; packing gland means including a packing within said cuff and a sectional gland ring attached to the end of said cuff and compression loading said packing for sealing engagement with said flanged joint; a bleed valve attached to said sleeve portion of the jacket body for bleeding fluid from the interior thereof and operable to seal off the jacket to contain the leaking fluid therein; a sectional guide ring comprising a pair of semicircular sections having circumferential extremities provided with ears for securing said sections together around said pipe section, said guide ring having an inner end provided with a lip for locating on the corner of the periphery of the outermost fluid line flange; and mounting arms extending axially from said ears and bolted to said axially extending flanges of the jacket sections for mounting said guide rings thereto, said packing gland ring encircling and being seated upon said guide ring.

References Cited in the file of this patent

UNITED STATES PATENTS

| | | |
|---|---|---|
| 316,967 | Heber | May 5, 1885 |
| 425,369 | Cowell | Apr. 8, 1890 |
| 441,141 | Dalton | Nov. 25, 1890 |
| 1,165,388 | Clark | Dec. 28, 1915 |
| 1,606,715 | Miller | Nov. 9, 1926 |
| 2,699,960 | Callery | Jan. 18, 1955 |
| 2,765,095 | Vick | Oct. 2, 1956 |
| 2,772,804 | Byrnes | Dec. 4, 1956 |